(12) United States Patent
Dietrich et al.

(10) Patent No.: US 12,503,946 B2
(45) Date of Patent: Dec. 23, 2025

(54) TURBINE BLADE WITH MODAL RESPONSE ADAPTED TIP SHROUD

(71) Applicant: Power Systems Mfg., LLC, Jupiter, FL (US)

(72) Inventors: Douglas James Dietrich, West Palm Beach, FL (US); Alexander Vasili Rozendaal, Palm Beach Garden, FL (US); Stephen Fiebiger, Jupiter, FL (US); Alex Torkaman, Port St Lucie, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 17/861,688

(22) Filed: Jul. 11, 2022

(65) Prior Publication Data

US 2024/0011401 A1   Jan. 11, 2024

(51) Int. Cl.
| | |
|---|---|
| *F01D 5/22* | (2006.01) |
| *F01D 5/14* | (2006.01) |
| *F01D 5/26* | (2006.01) |
| *F01D 25/06* | (2006.01) |

(52) U.S. Cl.
CPC ............ *F01D 5/225* (2013.01); *F01D 5/141* (2013.01); *F01D 5/26* (2013.01); *F01D 25/06* (2013.01); *F05D 2220/32* (2013.01); *F05D 2240/30* (2013.01); *F05D 2240/307* (2013.01); *F05D 2260/96* (2013.01)

(58) Field of Classification Search
CPC ..... F01D 5/16; F01D 5/26; F01D 5/10; F01D 25/06; F01D 5/225; F01D 11/122; F01D 11/125; F01D 11/127; F01D 11/12; F01D 5/141; F01D 5/143; F05D 2260/96
See application file for complete search history.

(56) References Cited

U.S. PATENT DOCUMENTS

| | | | | |
|---|---|---|---|---|
| 5,154,581 | A | * 10/1992 | Borufka | F01D 5/225 |
| | | | | 416/190 |
| 2005/0129519 | A1 | * 6/2005 | Beddard | F01D 5/225 |
| | | | | 416/192 |
| 2009/0053047 | A1 | * 2/2009 | Chiurato | F01D 5/225 |
| | | | | 415/173.1 |

* cited by examiner

*Primary Examiner* — Christopher Verdier
(74) *Attorney, Agent, or Firm* — Hovey Williams LLP

(57) ABSTRACT

A gas turbine blade for a gas turbine engine includes an attachment, a blade neck portion, a platform, an airfoil, and a shroud. The gas turbine engine has an operating speed range. The blade neck portion extends radially outward from the attachment. The platform is attached to the blade neck portion opposite the attachment. The airfoil extends radially outward from the platform. The airfoil includes a leading edge, a trailing edge, and an axial chord defined between the leading and trailing edges. The axial chord defines a mid-chord point. The shroud is attached to an end of the airfoil. The shroud includes an upper surface and a modal response tuning component attached to the upper surface of the shroud. The modal response tuning component is offset from the mid-chord point a predetermined distance to move modal response of the gas turbine blade outside of the operating speed range.

28 Claims, 2 Drawing Sheets

TURBINE BLADE WITH MODAL RESPONSE ADAPTED TIP SHROUD

BACKGROUND

The present invention relates generally to gas turbine engines, and more particularly, to a rotating blade for a gas turbine engine.

Gas turbine engines have compressor and turbine blades of varying length in order to compress and expand the fluid flow passing through the gas turbine engine as a result of combustion of liquid and/or gaseous fuels. During operation, the blades are placed under enormous stresses due to aerodynamic loading and high rotation speed of the gas turbine engine. As a result, the blades may undergo various combinations of bending and twisting motions, and under certain conditions, exhibit a response from a vibratory mode. One such motion is known as "flutter," where the blades undergo vibration. Flutter can lead to the blade becoming damaged. To facilitate damping the vibrations, a shroud may be added to the blades, most often at the blade tips. The shrouds serve to reduce blade vibrations by interlocking adjacent turbine blade tips, as well as to seal the blade tip region to prevent hot combustion gases from leaking around the blade tip and bypassing the turbine. However, while this sealing and damping design is somewhat effective, the use of some known shrouds still allow the blades to operate at or near a threshold for flutter. The present invention seeks to overcome the shortcomings of the prior art by providing a turbine blade shroud configuration that moves the location of the knife edge seal that is known in the prior art to improve blade modal response for improved flutter resistance.

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a gas turbine blade is provided. The blade includes an airfoil having a leading edge, a trailing edge, and an axial chord defined between the leading edge and the trailing edge. The axial chord defines a mid-chord point. The blade also includes a shroud attached to an end of the airfoil. The shroud includes an upper surface opposite the airfoil. The blade also includes a knife edge attached to the upper surface of the shroud. The knife edge defines a longitudinal central axis that is offset from the mid-chord point a predetermined distance.

In another aspect, a shroud for a gas turbine blade is provided. The gas turbine blade defines an axial chord having a mid-chord point. The shroud includes a lower surface, an upper surface spaced in relation to the lower surface, and a plurality of sidewalls extending between the lower and upper surfaces. The shroud also includes a knife edge attached to the upper surface. The knife edge defines a longitudinal central axis that is offset from the mid-chord point a predetermined distance.

In yet another aspect, a gas turbine blade for a gas turbine engine is provided. The gas turbine engine has an operating speed range. The gas turbine blade includes an attachment, a blade neck portion, a platform, an airfoil, and a shroud. The blade neck portion extends radially outward from the attachment. The platform is attached to the blade neck portion opposite the attachment. The airfoil extends radially outward from the platform. The airfoil includes a leading edge, a trailing edge, and an axial chord defined between the leading edge and the trailing edge. The axial chord defines a mid-chord point. The shroud is attached to an end of the airfoil. The shroud includes an upper surface opposite the airfoil and a modal response tuning component. The modal response tuning component is attached to the upper surface of the shroud. The modal response tuning component is offset from the mid-chord point a predetermined distance to move a modal response of the gas turbine blade outside of the operating speed range.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Broadly, aspects of the invention are directed to a gas turbine blade having a shroud that incorporates a knife edge that is located significantly aft of that known in prior art gas turbine blades. The unique placement of the knife edge creates an offset between the axes of vibratory motion and the supporting surfaces of the inter-blade contact surfaces. The offset improves the modal responses of the blade to reduce the susceptibility to aerodynamic flutter. Embodiments of the invention will be explained in connection with a turbine blade, but the detailed description is intended only as exemplary. Embodiments of the invention are shown in FIGS. 1-5, but the present invention is not limited to the illustrated structure or application.

Figure 1:
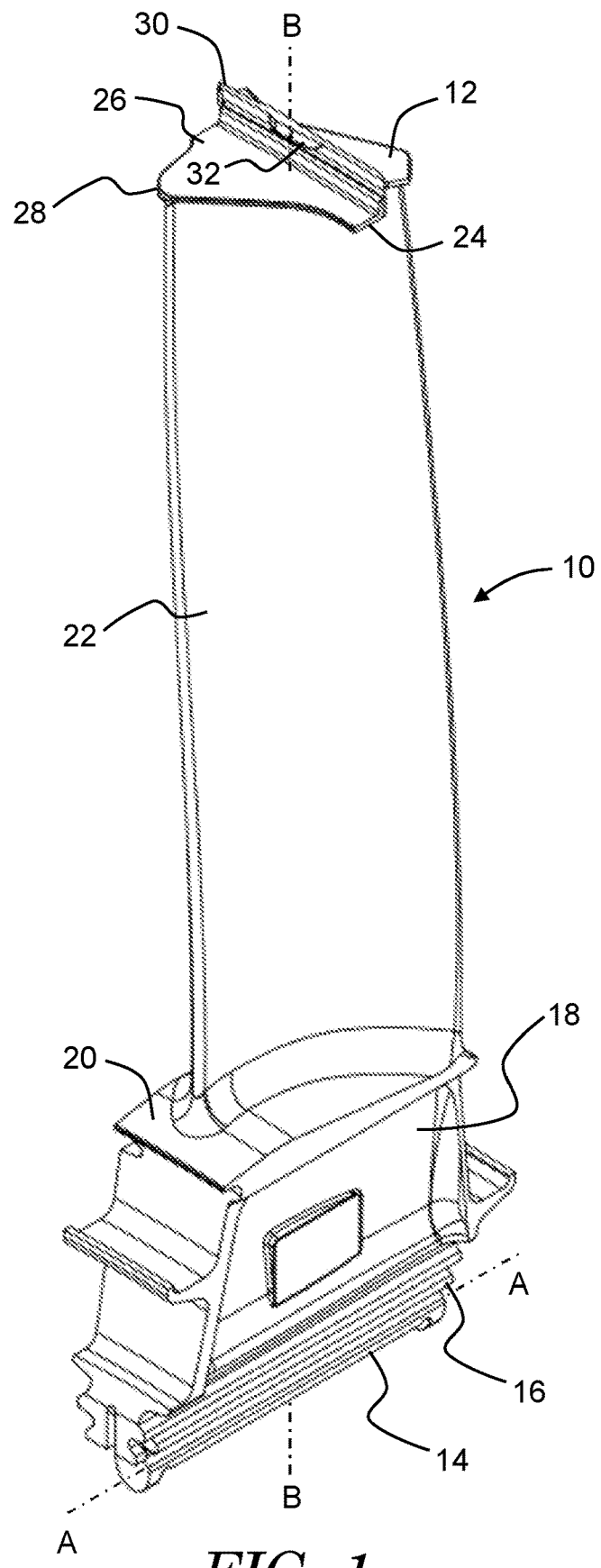
FIG. 1 is a perspective view of a gas turbine blade incorporating a shroud, in accordance with one aspect of the present invention.

FIG. 1 is a perspective view of a gas turbine blade 10 incorporating a shroud 12, in accordance with one aspect of the present invention. In the exemplary embodiment, the gas turbine blade 10 includes an attachment 14. The attachment 14 extends substantially parallel to an axis A-A. The attachment 14 includes a plurality of serrations 16 that facilitate attaching the gas turbine blade 10 to a blade disk (not shown). In the example embodiment, the serrations 16 are substantially parallel to the axis A-A. The gas turbine blade 10 includes a blade neck portion 18 that extends radially outward from the attachment 14. The blade neck portion 18 connects to the platform 20, which is generally planar in shape. An airfoil 22 extends radially outward from the platform 20. The airfoil 22 defines a generally radially extending mid-chord line B-B through which sections of the airfoil are stacked to create the airfoil 22.

Figure 2:
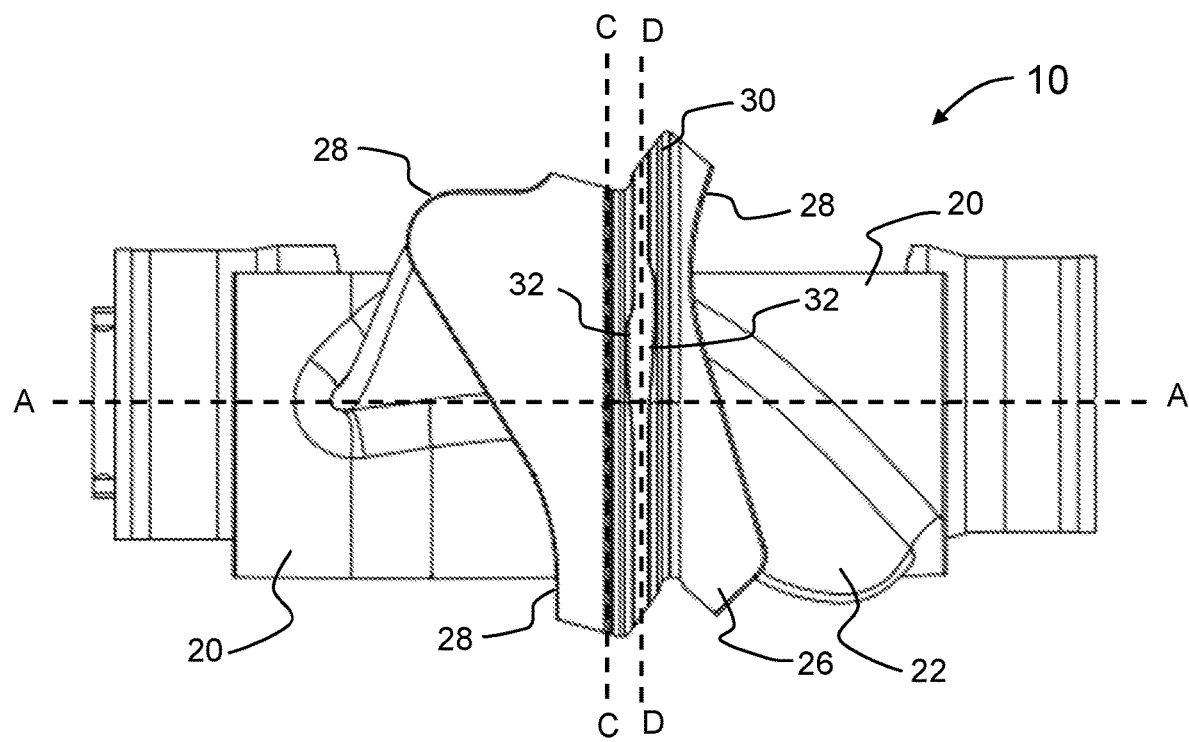
FIG. 2 is a top plan view of the gas turbine blade shown in FIG. 1, showing the shroud.
Figure 3:
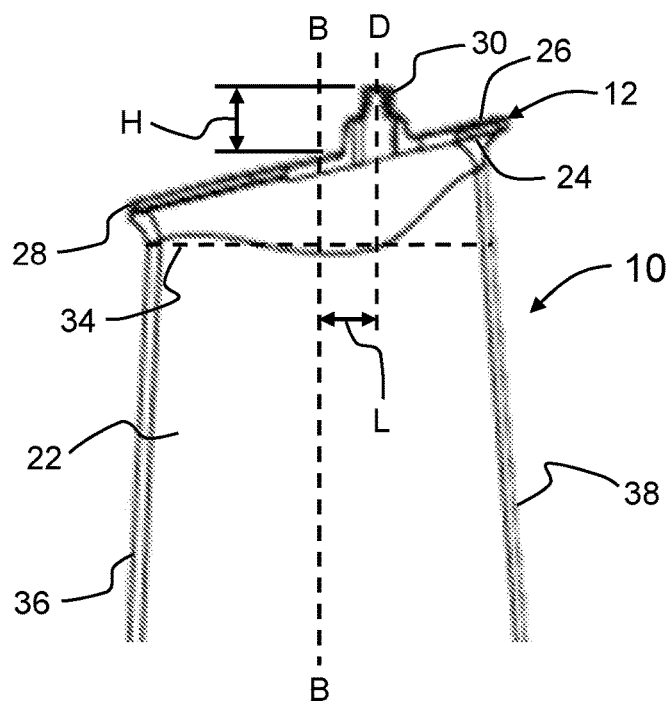
FIG. 3 is a side elevation view of an upper end of the gas turbine blade shown in FIG. 1, showing the shroud.

Referring additionally to FIGS. 2-3, the shroud 12 includes a lower surface 24, The lower surface 24 is attached to the airfoil 22 at an end opposite of platform 20. The shroud 12 also includes an upper surface 26, which is in spaced relation to and generally parallel to the lower surface 24. A plurality of sidewalls 28 extend radially between and generally perpendicular to the lower surface 24 and the upper surface 26. The plurality of sidewalls 28 define a periphery of the shroud 12.

In the example embodiment, the shroud 12 also includes a knife edge 30 (also referred to herein as a modal response tuning component) that is attached to and extends radially outward from the upper surface 26. The knife edge 30 has a predetermined height H from the upper surface 26. The knife edge 30 extends across the upper surface 26 to the periphery of the shroud 12, such that the ends of the knife edge 30 define at least a portion of the periphery. In the example, the knife edge 30 is integrally formed with the shroud 12. Referring to FIG. 2, in the example embodiment, the knife edge 30 extends across the upper surface 26, defining a longitudinal central axis D-D that is substantially perpendicular to axis A-A. The gas turbine blade 10 defines an axis C-C, which is substantially perpendicular to axis A-A and intersects the mid-chord line B-B (shown in FIGS. 1 and 3) on the upper surface 26 of the shroud 12. The mid-chord line B-B and the axis C-C define a plane BC (not shown) that is substantially perpendicular to axis A-A and passes through the mid-chord of the gas turbine blade 10. As described further herein, the longitudinal central axis D-D of the knife edge 30 is offset in the aft direction relative to the mid-chord line B-B or plane BC.

Referring to FIGS. 1 and 2, in some embodiments, the knife edge 30 includes one or more cutting teeth 32 protruding outwardly from the knife edge 30. The cutting teeth 32 are positioned adjacent the knife edge 30 of a turbine blade shroud 12 to cut a groove in a surrounding compliant rub strip (not shown) such that a seal between the gas turbine blade 10 and surrounding rub strip is created. Cutting a slot wider than the width of the knife edge 30 ensures the thinner knife edge 30 will not contact the rub strip. Cutting a wider slot with margin on either side of the knife edge 30 to compensate for shroud 12 movement can be accomplished by multiple cutter teeth as shown in FIGS. 1 and 2. In the example, cutting teeth 32 are spaced or staggered along the knife edge 30, and positioned remote from each end of the knife edge 30 to provide an even stress distribution. In the example, the knife edge 30 and the cutting teeth 32 are integrally cast into gas turbine blade 10. Although being cast into the turbine blade 10, typically the size and shape of the cutting teeth 32 and the knife edge 30 are determined by a final machining process.

As described herein, in some circumstances, turbine blades, such as the gas turbine blade 10, may undergo vibratory motion (e.g., bending and/or torsional vibration) known as flutter. Flutter occurs when the vibratory motion of one turbine blade amplifies the vibratory motion of a neighboring turbine blade. Inter-blade phase angle describes the vibratory motion direction of a turbine blade relative to the direction of a neighboring turbine blade. Certain phase angles have a maximum ability to excite a neighboring turbine blade, depending on the turbine blade design, shape, size, etc. As such, different turbine blade designs may have a different phase angle that is most unstable.

In the disclosed embodiment, the gas turbine blade 10 has several natural frequencies and modal responses that may be excited as the speed of the associated gas turbine engine increases. These modal responses may include, for example, one or more of a torsional modal response, a flexural modal response, and/or a bending modal response. If a modal response occurs within the operating speed of the gas turbine engine, high cycle fatigue and blade failure are more likely to occur. In the example embodiment, the location of a modal response tuning component (e.g., the knife edge 30) of the gas turbine blade 10 is positioned so that the frequency of the modal responses is changed without significantly affecting the stresses and/or increasing the susceptibility to creep of the gas turbine blade 10. The offset position of the knife edge 30 changes or moves the modal response of the gas turbine blade 10 so that the modal responses occur outside of the operating speed range of the gas turbine engine.

Referring to FIG. 3, the airfoil 22 of the gas turbine blade 10 defines an axial chord having an axial chord length 34. Typically, the axial chord length 34 for a gas turbine engine blade is defined as the length of a projection of the gas turbine blade 10, as set in the gas turbine engine, onto a line parallel to the gas turbine engine axis. That is, the length between a leading edge 36 of the airfoil 22 and a trailing edge 38 of the airfoil 22. The longitudinal central axis D-D of the knife edge 30 is offset from the mid-chord line B-B toward the trailing edge 38 a predetermined distance L. It is noted that the mid-chord line B-B is located at a center point (or mid-chord point) of the axial chord. In the example embodiment, the predetermined distance L is in the range between and including about five percent (5%) of the axial chord length 34 to about fifteen percent (15%) of the axial chord length 34. In another embodiment, the predetermined distance L is in the range between and including about seven percent (7%) of the axial chord length 34 to about twelve percent (12%) of the axial chord length 34. In a preferred embodiment, the predetermined distance L is about nine percent (9%) of the axial chord length 34.

It has been determined that placing the location of the knife edge 30 about ten percent (10%) of the axial chord length 34 to about twenty-five percent (25%) of the axial chord length 34 aft of the mid-chord line of the inventive turbine blade 10 facilitates reducing the maximum amount of negative aero damping (when plotted on an aero damping curve) by about forty percent (40%).

Turbine blades known in the prior art have their stacking axis or mid-chord axis passing through the centroids of the base (or attachment) portion, airfoil, and shroud. However, by balancing the mass of the shroud 12 to avoid increasing bending stresses and the creep distortion that can result from unbalanced shroud overhangs, the location of the knife edge 30 can be shifted aft of mid-chord location.

Advantages of the gas turbine blade design described above include reducing the modal response of the gas turbine blade, and therefore, reducing the gas turbine blades susceptibility to flutter. As a result, there can be a reduction in the occurrence of component failure, attendant downtime, and maintenance costs. Further, the gas turbine blade can be easily replaced if it requires repair due to wear or abusive operation.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the following specification and claim, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claim, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

The terms "coupled," "fixed," "attached to," and the like refer to both direct coupling, fixing, or attaching, as well as indirect coupling, fixing, or attaching through one or more intermediate components or features, unless otherwise specified herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A gas turbine blade comprising:
   an airfoil comprising a leading edge, a trailing edge, and an axial chord defined between the leading edge and the trailing edge, the axial chord being defined as a length of a projection of the gas turbine blade, as set in a gas turbine engine, onto a line parallel to an axis of the gas turbine engine, the axial chord defining a mid-chord point;

a shroud attached to an end of the airfoil, the shroud comprising:
an upper surface opposite the airfoil; and
a single knife edge attached to the upper surface of the shroud,
the single knife edge defining a longitudinal central axis that is offset from the mid-chord point a predetermined distance, thereby changing a frequency of a modal response of the gas turbine blade without increasing bending stresses and creep distortion of the gas turbine blade that are present when the longitudinal central axis is at the mid-chord point.

2. The gas turbine blade in accordance with claim 1,
wherein said central axis is offset from the mid-chord point the predetermined distance toward the trailing edge of the airfoil.

3. The gas turbine blade in accordance with claim 2,
said predetermined distance being in the range between and including ten percent (10%) of the axial chord length to twenty-five percent (25%) of the axial chord.

4. The gas turbine blade in accordance with claim 2,
said predetermined distance being in the range between and including fourteen percent (14%) of the axial chord length to twenty-one percent (21%) of the axial chord.

5. The gas turbine blade in accordance with claim 2,
said predetermined distance being eighteen percent (18%) of the axial chord.

6. The gas turbine blade in accordance with claim 1,
said predetermined distance being in the range between and including ten percent (10%) of the axial chord length to twenty-five percent (25%) of the axial chord.

7. The gas turbine blade in accordance with claim 1,
said predetermined distance being in the range between and including fourteen percent (14%) of the axial chord length to twenty-one percent (21%) of the axial chord.

8. The gas turbine blade in accordance with claim 1,
said predetermined distance being eighteen percent (18%) of the axial chord.

9. The gas turbine blade in accordance with claim 1,
said single knife edge comprising one or more cutting teeth protruding outwardly from said knife edge.

10. The gas turbine blade in accordance with claim 9,
said one or more cutting teeth comprising a pair of cutting teeth staggered with respect to each other and remote from each end of said single knife edge.

11. A shroud for a gas turbine blade, the gas turbine blade defining an axial chord, the axial chord being defined as a length of a projection of the gas turbine blade, as set in a gas turbine engine, onto a line parallel to an axis of the gas turbine engine, the axial chord defining a mid-chord point, said shroud comprising:
a lower surface;
an upper surface spaced in relation to the lower surface;
a plurality of sidewalls extending between the lower and upper surfaces; and
a single knife edge attached to the upper surface,
the single knife edge defining a longitudinal central axis that is offset from the mid-chord point a predetermined distance, thereby reducing a maximum amount of negative aero damping of the gas turbine blade without increasing bending stresses and creep distortion of the gas turbine blade that are present when the longitudinal central axis is at the mid-chord point.

12. The shroud in accordance with claim 11,
said predetermined distance being in the range between and including ten percent (10%) of the axial chord length to twenty-five percent (25%) of the axial chord.

13. The shroud in accordance with claim 11,
said predetermined distance being in the range between and including fourteen percent (14%) of the axial chord length to twenty-one percent (21%) of the axial chord.

14. The shroud in accordance with claim 11,
said predetermined distance being eighteen percent (18%) of the axial chord.

15. A gas turbine blade for a gas turbine engine having an operating speed range, the gas turbine blade comprising:
an attachment;
a blade neck portion that extends radially outward from the attachment;
a platform attached to the blade neck portion opposite the attachment;
an airfoil extending radially outward from the platform, the airfoil comprising a leading edge, a trailing edge, and an axial chord defined between the leading edge and the trailing edge, the axial chord being defined as a length of a projection of the gas turbine blade, as set in a gas turbine engine, onto a line parallel to an axis of the gas turbine engine, the axial chord defining a mid-chord point;
a shroud attached to an end of the airfoil, the shroud comprising:
an upper surface opposite the airfoil; and
a single modal response tuning component attached to the upper surface of the shroud,
the single modal response tuning component defining a longitudinal central axis that is offset from the mid-chord point a predetermined distance, thereby moving a modal response of the gas turbine blade outside of the operating speed range without increasing bending stresses and creep distortion of the gas turbine blade that are present when the longitudinal central axis is at the mid-chord point.

16. The gas turbine blade in accordance with claim 15,
said central axis offset from the mid-chord point the predetermined distance toward the trailing edge of the airfoil.

17. The gas turbine blade in accordance with claim 16,
said predetermined distance being in the range between and including ten percent (10%) of the axial chord length to twenty-five percent (25%) of the axial chord.

18. The gas turbine blade in accordance with claim 16,
said predetermined distance being in the range between and including fourteen percent (14%) of the axial chord length to twenty-one percent (21%) of the axial chord.

19. The gas turbine blade in accordance with claim 16,
said predetermined distance being eighteen percent (18%) of the axial chord.

20. The gas turbine blade in accordance with claim 15,
wherein the modal response is one or more of the following: a torsional modal response, a flexural modal response, and a bending modal response, of the gas turbine blade.

21. A gas turbine blade for a gas turbine engine having an operating speed range, the gas turbine blade comprising:
an airfoil comprising a leading edge, a trailing edge, and an axial chord defined between the leading edge and the trailing edge, the axial chord being defined as a length of a projection of the gas turbine blade, as set in the gas turbine engine, onto a line parallel to an axis of the gas turbine engine, the axial chord defining a mid-chord point;

a shroud attached to an end of the airfoil, the shroud comprising:

an upper surface opposite the airfoil; and a single knife edge attached to the upper surface of the shroud, the single knife edge defining a longitudinal central axis that is offset from the mid-chord point toward the trailing edge a distance in a range between and including ten percent (10%) of the axial chord length and twenty-five percent (25%) of the axial chord length, thereby changing a frequency of a modal response of the gas turbine blade so that the modal response occurs outside the operating speed range and without increasing bending stresses and creep distortion of the gas turbine blade that are present when the longitudinal central axis is at the mid-chord point.

22. The gas turbine blade in accordance with claim 21, wherein the modal response is one or more of the following: a torsional modal response, a flexural modal response, and a bending modal response, of the gas turbine blade.

23. The gas turbine blade in accordance with claim 22, said single knife edge comprising one or more cutting teeth protruding outwardly from said knife edge.

24. The gas turbine blade in accordance with claim 23, said one or more cutting teeth comprising a pair of cutting teeth staggered with respect to each other and remote from each end of said knife edge.

25. The gas turbine blade in accordance with claim 21, said single knife edge comprising one or more cutting teeth protruding outwardly from said knife edge.

26. The gas turbine blade in accordance with claim 25, wherein the modal response comprises a torsional modal response of the gas turbine blade.

27. The gas turbine blade in accordance with claim 25, wherein the modal response comprises a flexural modal response of the gas turbine blade.

28. The gas turbine blade in accordance with claim 25, wherein the modal response comprises a bending modal response of the gas turbine blade.

* * * * *